May 10, 1960

R. V. HIGDON ET AL 2,936,333

OSCILLOSCOPE RECORDER

Filed Nov. 23, 1953

INVENTORS
ROBERT V. HIGDON
JOHN L. McLUCAS
BY
Mitchell & Bechert
ATTORNEYS

May 10, 1960 R. V. HIGDON ET AL 2,936,333
OSCILLOSCOPE RECORDER
Filed Nov. 23, 1953 3 Sheets-Sheet 2

INVENTORS
ROBERT V. HIGDON
JOHN L. McLUCAS
BY Mitchell Bechert
ATTORNEYS

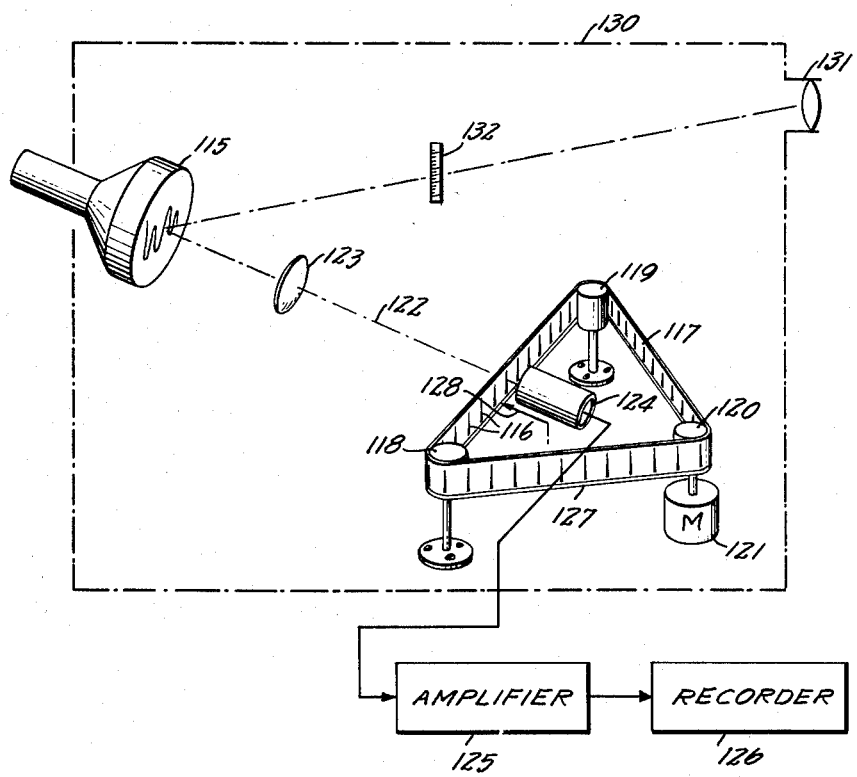

United States Patent Office 2,936,333
Patented May 10, 1960

2,936,333

OSCILLOSCOPE RECORDER

Robert V. Higdon and John L. McLucas, State College, Pa., assignors, by mesne assignments, to HRB-Singer, Inc., State College, Pa., a corporation of Delaware Application November 23, 1953, Serial No. 393,830

27 Claims. (Cl. 178—6.6)

Our invention relates to improved means for recording the intelligence displayed on a transient-display device, such as a cathode-ray oscilloscope.

The usual way of recording information from the face of an oscilloscope is the photographic process. This process is subject to several limitations, such as cost, time required to produce a record, and quantity of light available for exposure; the film can be used only once, and it is not always possible to get enough light to expose the film. Furthermore, there are many applications in which it is desired to recreate the oscilloscope pattern for later analysis, in order to display, and thus to permit extended study of, certain time-variations or modulations of interest. This latter application is impossible with film unless motion pictures are used, and this is, of course, expensive.

It is, accordingly, an object of our invention to provide an improved oscilloscope recorder.

Another object is to provide an oscilloscope recorder lending itself to the recreation of oscilloscope data whenever and as often as desired.

It is a further object to provide an improved means for compressing the bandwidth of video signals displayed on an oscilloscope.

It is also an object to provide improved means utilizing magnetic tape for the storage of oscilloscope-displayed information.

It is a specific object to provide a relatively simple device which may be attached to or supported in front of the face of a conventional cathode-ray oscilloscope, and which, without interfering with visual inspection of the display, may record the display data on magnetic tape in a manner readily adaptable to subsequent recreation and oscilloscopic display.

It is a further specific object to provide means whereby the same oscilloscope may not only produce an original display of intelligence, but also a recreation of the same display whenever and as often as later desired.

Other objects and various further features of novelty and invention will become apparent or will occur to those skilled in the art from a reading of the following specification in conjunction with the accompanying drawings.

Briefly stated, our invention contemplates the use of an optical wedge as part of an optical scanning mechanism to scan amplitude-modulated oscilloscopic displays. Relying on the persistence characteristics of the display face, our mechanism compresses the bandwidth of the display into a range which either may be easily accommodated on magnetic storage tape, or may lend itself readily to remote transmission over communication links accommodating audio frequencies.

The scanner itself may take various forms depending upon the base against which the amplitude modulation is originally displayed. For example, the base may be a circle, and amplitude modulations may take the form of radially outward or inward deviations from the base circle; alternately, the display may be characterized by a lineal base or reference axis for the amplitude modulations. In either event, our scanning mechanism is such as continuously to orient the image of a scanning slit generally transversely to the display base, which, of course, would mean a radial orientation for circular displays and a vertical orientation for horizontally-based displays. An optical wedge in the optics, including the slit, may variously attenuate light passing the slit in accordance with the position in the slit, so that photoelectric means responsive to light passing all the way through the systems may develop an amplitude-modulated video signal reflecting amplitude modulations in the original display.

Bandwidth reduction or compresion results, as indicated above, from reliance on the persistence property of the oscilloscope face temporarily to preserve the displayed transient, and from driving our optical scanner at a rate representing a substantial submultiple of the sweep-recurrence frequency for the base in the original display. Bandwidth reduction can be so substantial, even for transients in the megacycles, that the scanner-output signals may be stored on magnetic tape; these signals may thereafter be played back through the same or through a different oscilloscope, and viewed at leisure. Essentially, our recording process involves writing on the oscilloscope face at a relatively high rate and reading out of the oscilloscope face at a relatively low rate. The original signal applied to the oscilloscope display may either be continuously repetitive, or it may be a transient occurring only once, or it may be gated periodically so that the output stored on the tape is a sample of the original. In the various forms to be described, we show how our invention may be adapted to most of the cases of interest in laboratory oscilloscope use.

In the drawings, which show, for illustrative purposes only, preferred forms of the invention:

Figs. 5, 6 and 7 are diagrammatic representations of further alternative forms of the invention.

Figure 1:
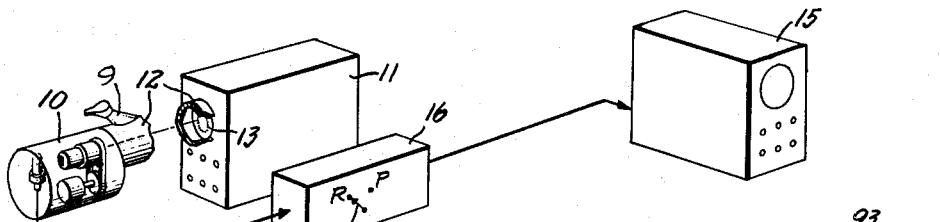
Fig. 1 is a simplified view in perspective, with certain parts broken away, and illustrating adaptation of our invention to the recording and to the recreation of an oscilloscope display.

Referring to Fig. 1 of the drawings, our invention is shown basically to comprise an optical scanner unit 10 which may be a single package for attachment to or for separate mounting adjacent a conventional oscilloscope 11, as by connection through a light shield or hood 12 to the viewing face or screen 13 of the oscilloscope; an eyepiece 9 on one side of hood 12 may permit visual inspection at any time. The scanner unit 10 may develop in an output line 14 a video signal representing substantial bandwidth compression of the original display on the screen 13, and the compression may be such as to permit relaying over a standard communication link, as for recreated display on a remote oscilloscope 15. In the form shown, we schematically designate the communication link by the box 16, and for purposes of laboratory use, it is convenient to employ a standard magnetic recorder as this link. The recorder 16 may utilize magnetic oxide tape and may be provided with manual control means 17 for selecting the recording and playback functions as desired, and as suggested by the legends "R" and "P" in the diagram. The elements within the scanner 10 shown in Fig. 1 happen to be best adapted for transscription of circular traces, and this particular scanner mechanism will be described in more detail in connection with Fig. 5.

Figure 2:
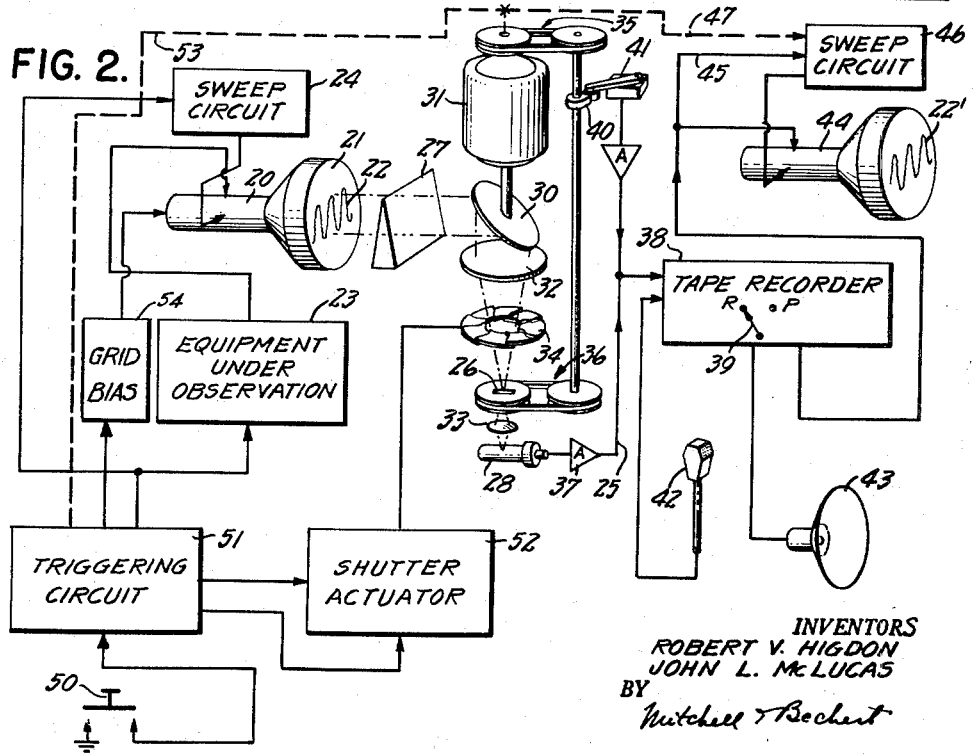
Fig. 2 is a simplified diagram schematically illustrating a modification of the invention.

In Fig. 2, we show application of the principles of our invention to the recording and play-back of oscilloscope displays characterized by amplitude modulations transverse to a lineal sweep base. The original-display oscilloscope may comprise a cathode-ray tube 20, having a display screen 21 on which the display or trace 22 is presented. The display 22 involves vertical deflection in accordance with the amplitude of signals developed by equipment 23 under observation, and these deflections are applied against a horizontal sweep, as provided by a conventional sweep circuit 24.

In accordance with the invention, we provide an optical-scanning device for transcribing the display 22 into a video signal appearing in output line 25 with a bandwidth substantially reduced from that characterizing the video signal developed from the equipment 23 under observation. The scanning means may employ an elongated optical slit 26, as well as means for imaging the slit 26 on the face 21 of tube 20 in an orientation constantly aligned with the amplitude-modulation axis, which happens to be the vertical-deflection axis for the tube 20. The scanning mechanism includes means for periodically sweeping the image of the slit 26 across the base or horizontal axis for the display 22, and in order to develop an output-signal intensity reflecting amplitude excursions in the original display, we insert an optical wedge 27 in the optical path, between the display 22 and a photomultiplier 28, for developing a video signal to be recorded. The wedge 27 is schematically shown as of progressively varying thickness, representing progressively varying density, along the vertical axis and, therefore, along the slit axis; but it will be understood that the representation at 27 may contemplate a conventional photographic gray scale of varying density meeting the same specifications and held, if desired, directly against the viewing screen 21.

In the form shown, the scanner comprises a mirror 30, inclined at 45 degrees to an axis of rotation determined by drive motor 31, and also at 45 degrees to a sweep plane including the horizontal axis of the display 22. Lens means 32 may serve to image the slit (through the scanning mirror 30) on the face of tube 20, and further lens means 33 may serve to concentrate such light as passes the slit 26 onto the collecting element of the photomultiplier 28. Diaphragm or shutter means 34 may be placed in the optical path for control of aperture or exposure, as needed. In order to maintain the image of the slit 26 in constant orientation with respect to the amplitude-deflection axis of the display 22, mechanical means 35—36 may continuously align the slit 26 in accordance with the instantaneous orientation of the scanning mirror 30.

The output of the photomultiplier 28 may be amplified as needed (at 37) for relay to a communication link, such as a magnetic-tape recorder 38, which, for greater convenience of use, may be of the multi-channel variety, accepting the video signal in line 25 for recording in one of the available channels, as when the manual control 39 is set for a recording operation. The nature of the signal that is periodically scanned by the described mechanism may be such as to permit ready generation of a synchronizing pulse for use in recreating the display, but in the form shown, we deliberately create such a synchronizing pulse by cam and switch means 40—41, operating from the mechanical connection between the slit 26 and mirror 30. The amplified synchronizing pulse may be superposed on the video signal and recorded on the same single channel in the recorder 38. For convenience in interpreting an accumulation of oscilloscopic records on the tape in recorder 38, another recording channel thereof may carry a verbal transcript or description of the record, as applied by means of a microphone 42 and played back over speaker means 43.

In recreating the tape-recorded signal, selector means 39 need only be shifted to the play-back position, and applied (after suitable amplification) for the vertical deflection of the beam of another cathode-ray display tube 44. Of course, the sweep period or base against which the recreated signal is displayed must be synchronized with the sweep rate for the scanner 30, and we have suggested by means of a synchronizing connection 45 to the sweep circuit 46 that the synchronizing pulses recorded on the video-record channel may perform this function; alternatively, we suggest by the dashed-line connection 47 that the shaft of motor 31 may be connected directly in synchronized relation with the sweep circuit 46, so as to leave a clear video recording, uncluttered by synchronizing pulses.

In use, a repetitive transient may be effectively continuously displayed at 22 on the original display tube, and recording purposes may be served upon scanning the display 22 with mirror 30 for a defined length of time; the playback oscilloscope 44 will recreate the original display (at 22′) for as long a period as permitted by the length of recording tape, or on an indefinite basis if the tape should be of the relatively short endless variety. Frequently, however, it is necessary to record a non-repetitive transient, in which case it is desirable to employ a phosphor of relatively long persistence on the display screen 21. To assist in observing such transients, we have shown manual means 50 for initiating the transient in the equipment 23 under test, through a triggering circuit 51, which may serve first to open and then to close shutter means 34 (through a suitable actuator 52), as well as initiate the sweep at 24 (through line 24′), all in accordance with basic synchronism derived by means 53 connected with the scanning mechanism; circuit 51 may serve the additional function of "turning on" and "turning off" the cathode-ray beam by control of grid bias at 54. By this means, the shutter may be kept open for one scanning frame or for an even number of scanning frames, and the transient available from the manual starting impulse applied at 50 may be synchronized with shutter action. If the transient is recorded on a short endless belt of recording tape in recorder 38, then the transient may be reproduced at 22′ on a repetitive basis.

It will be seen that the proper development of a video signal in output line 25 rests on the assumption that the beam current in tube 20 and the phosphor distribution over the face 21 may be maintained substantially constant, so that the amount of light which emanates from any given part (elementary area) of the phosphor and which passes the slit is consistently related to the signal amplitude represented at that particular part of the oscilloscope face. The transfer function of the phosphor is assumed linear, that is, the light output of the phosphor is assumed to be proportional to the electron current striking the phosphor; we have found that this condition can be maintained over reasonable levels of beam current. The transfer function of the wedge 27 or gray scale is preferably linear or equalizes the response characteristic of the photomultiplier 28, all in the sense that the light passing through the wedge may develop a video signal in line 25 of amplitude or intensity proportional to the position of the light source (elementary phosphor area) with respect to the base line (sweep axis) or reference position of the display 22.

Figure 3:
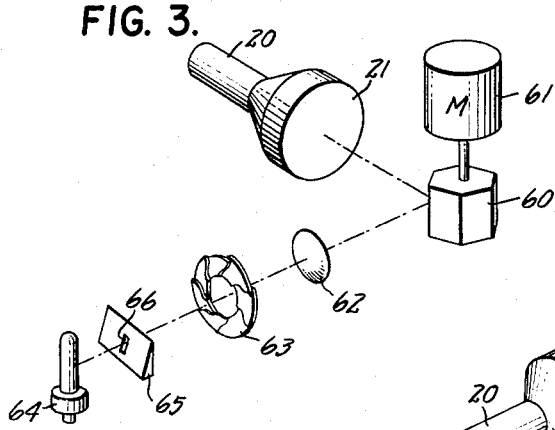
Figs. 3 and 4 are simplified optical diagrams of alternative arrangements for certain parts in Fig. 2.

In Fig. 3, we show a modification of the optics in scanning mechanism for displays of the type described at 22 in Fig. 2. The scanner of Fig. 3, however, makes use of a polygonal reflecting prism 60, continuously driven by a scanning motor 61 about an axis transverse to the reference (horizontal) axis of the display, so as to scan the display base a plurality of times for each revolution of the prism. The optical system may otherwise resemble that described in Fig. 2 and, therefore, we show a focusing element 62, a diaphragm or shutter 63, and a photomultiplier 64. For our purposes, it makes no particular difference where the optical wedge is placed between the display face 21 and the photomultiplier 64; but in Fig. 3, we show the wedge 65 adjacent the photomultiplier 64, and we indicate that the slit 66 may be formed by masking techniques on one surface of the wedge 65, as will be understood.

Figure 4:
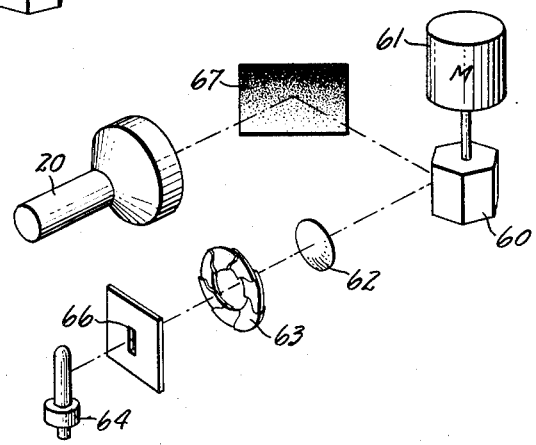

The wedge that is characteristic of our invention has been discussed as a variable light attenuator having preferably a linear characteristic on an axis transverse to the scanning axis, or, rather, along the principal axis of the slit. In Fig. 4, we illustrate that a wedge may be in the form of a suitably treated mirror 67, and since the parts closely resemble those described in Fig. 3, they have been given the same reference numerals. We have placed the wedge mirror 67 between the display face of tube 20 and the prism 60, and have indicated by shading on the face of mirror 67 that the wedge effect is produced by varying the reflectance thereof; thus, the mirror 67 may be a perfect reflector along the top edge, and may be a perfect transmitter of light along the bottom edge, the reflectance varying from top to bottom, preferably linearly, as will be understood.

Figure 5:
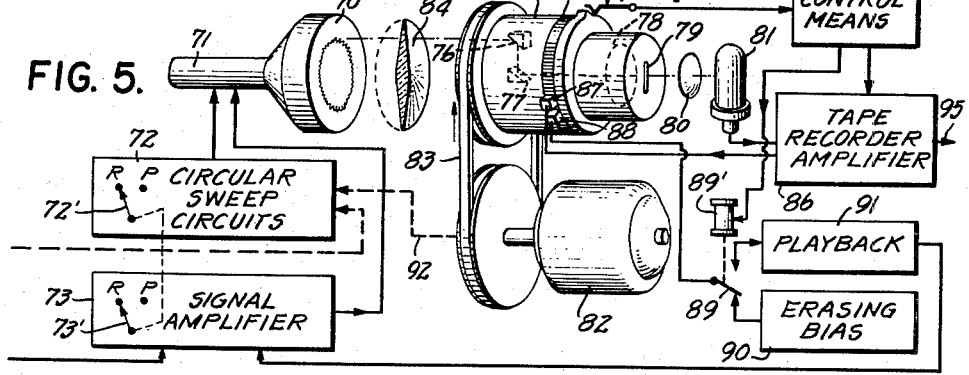

Thus far, we have described our invention particularly in connection with the recording or transcription of oscilloscopic displays presented against a lineal base, but we have indicated generally that the invention is also applicable to the transcription of circular displays, such as certain Lissajous phase diagrams, or a J-scope presentation in which radial deflections against a circular display base connote amplitude-modulation of the signal. In Fig. 5, we illustrate means for transcribing such displays appearing on the face 70 of a display oscilloscope 71 having suitable means 72 for creating a circular sweep, and provided with signal-amplifier means 73 for creating radial deflections in accordance with input-amplitude variations.

The optical scanner may comprise a rotating head 75, containing a first scanning mirror 76 and a second scanning mirror 77, located respectively off and on the axis of scanning, as suggested by the dot-dash line connoting the optical axis. The scanner may further include a focusing optical element 78, a slit 79, a further focusing element 80, and a photomultiplier 81; a motor 82 may continuously drive the scanning head 75 through pulley means 83. The optical wedge may be introduced in the system as a variable attenuator pasted over the slit 79 and, therefore, carried for rotation with the scanning head 75, but we have shown a separate wedge 84 having an axis of symmetry coinciding with the scanning axis, and of density varying uniformly in the radial direction.

Inasmuch as one full scan by the head 75 always covers a full display of the type shown on tube face 70, magnetic-recording tape 85 may be fixedly carried by the scanning head 75 so that the scanning head becomes a drum recorder. We have shown a recorder amplifier 86 directly responsive to the multiplier output, and have connected this amplifier 86 to a recording element 87 adjacent the tape 85. Immediately adjacent the recording head 87, we have provided a second head 88 which may serve as an erasing head or as a pickup head, depending upon the intended use; and to implement this function we show switching means 89 permitting selective connection of the head 88 to erasing means 90 and to playback amplifier 91.

In accordance with a further feature of the invention, the same display tube 71 which is used for the original display may be used in the recreation of a signal transcribed or recorded by the described mechanism. For this purpose, we have connected the output of the playback amplifier 91 to the signal amplifier 73, as when the selector 73' is thrown from the record position "R" to the play-back position suggested by the legend "P." At the same time (as suggested by the dashed-line interconnection of selector switches), the corresponding selector switch 72' in the sweep circuit 72 may also be thrown so as to adapt the recreated display to a correct time base; to permit synchronism of the sweep circuit in the recreated display, we have suggested by dashed lines 92 that the scanning motor 82 may perform this function.

Operation of the arrangement of Fig. 5 will be better understood from a description of a typical cycle. All selector switches may be normally in the positions shown, that is, set for continuous recording of a video signal on the drum 85. If the display signal should be of the recurrent type, then the continuous recording on drum 85 will involve developing the stored intelligence and erasing it once for every scanning cycle, but at any instant of time, substantially a full cycle of recorded information will be available on the drum. Whenever it is desired to preserve such a full cycle of recorded information, control means 93 may be actuated, as by depression of a manual push button (not shown), and this may simultaneously (1) shift switch 89 (through solenoid 89') to the play-back position and (2) disable amplifier 86 to prevent further recording at 87. The record of a full cycle may thus be preserved indefinitely on the drum 85, and by means of a synchronizing switch 94 operated off a small detent or cam on the drum 75, it will be understood that the preserved record may bear a given start-and-finish relation to a desired origin or reference in the original display. Having thus preserved the recorded cycle, switches 72' and 73' may be shifted to the play-back position to determine whether the record at 85 is satisfactory. If the record is satisfactory, then a permanent tape or other record may be made by means described at 38 in Fig. 2, merely by tapping off a desired number of repeats of the recorded cycle at a suitable amplifier-output connection 95.

Figure 6:
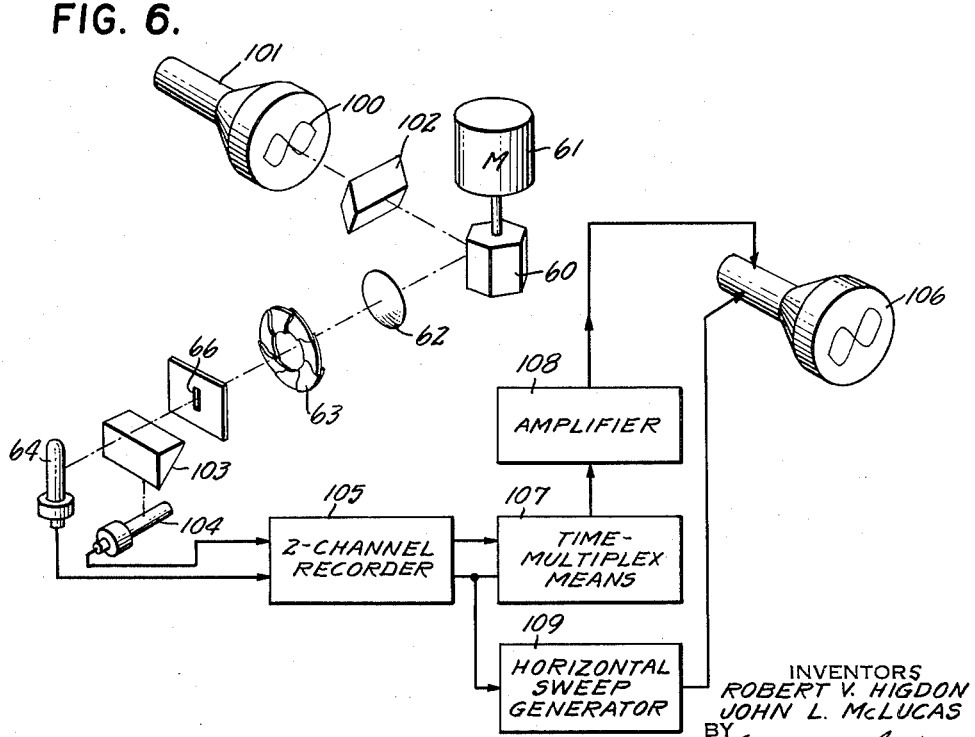

In Fig. 6, we show a modification lending itself to the recording and recreation of more complex oscillographic displays in which the development of a multiple loop is involved, as for the familiar phase cross-over or two-phase display 100 on the face of tube 101. The sweep circuit which produces the reference or base for the display 100 may be as described at 24 in Fig. 2, and to the extent that the scanning optical elements of Fig. 6 correspond to those described in Fig. 3, they have been given the same reference numerals.

The optical wedge of Fig. 6 must be able to discriminate both uppir and lower limits of the display diagram; therefore, the wedge is preferably characterized by first and second linear variations of density along the slit axis. As in the case of the other forms, such a wedge may be merely a suitable variable-density strip of photographic film pasted over the slit 66 or over the face of the tube 101, but we have shown at 102 a double wedge having maximum transmission at the upper and lower limits and oriented with the central zone of maximum density more or less aligned with the sweep axis or base of the display 100.

After the modulated light (developed from the display 100, as scanned by means 60) has passed the slit 66, a fixed mirror 103 may separate the upper from the lower half of this modulation, for development (in separate photomultipliers 64—104) of two separate video signals which may conveniently be recorded simultaneously on the separate tracks of a commercial two-channel recorder 105.

To recreate the signal transcribed from the display 100 on the face of a second display tube 106, a two-gun oscilloscope with separate vertical-deflection systems (but operated from the same horizontal sweep circuit) may respond to the separate outputs of the two channels of recorder 105; however, we have shown switching means 107 for relatively high-speed electronic commutation of the two-channel output. Switch 107 may provide a single time-multiplexed video input to amplifier means 108 for directly feeding the vertical deflection system of a conventional or single-gun display tube 106, having horizontal sweep means 109 synchronized with the recycling rate of the optical scanner 60, as developed from the output of one of the two signals of recorder 105, In the various forms thus far described, we have referred to an optical wedge as a light attenuator and have specifically shown such attenuator as of variable density. Optical wedges may take other forms, as, for example, a slit of variable width; in Fig. 7, we illustrate a scanner in which the scanning slit and the optical wedge are one and the same part.

In Fig. 7, a display on the face of an oscilloscope 115 is periodically scanned by successive wedge slits 116 formed at equal spacings on an endless flexible band 117. The band 117 may be stretched over three rollers or pulleys 118—119—120, and the necessary drive may be imparted by a motor 121 to one of the pulleys. Band 117 may conveniently be of photographic film, with the wedge slits 116 oriented transversely as shown, and with a precise spacing representing the projection of at least the full time-base width depicted in the display. The span of belt 117 between pulleys 118—119 is preferably normal to the optical projection axis 122, which is schematically shown to include a projection lens 123. Light passing the scanning slits 116 may be collected by a further focusing lens for focus on the cathode of a photomultiplier 124, but in the form shown we have schematically indicated that such further lens may not be necessary upon a proper proportioning of the optics. The output of the photomultiplier 124 may be supplied to amplifier and recording means 125—126, for processing and use in the manner discussed in connection with other forms above.

The scanner of Fig. 7 should be driven at a rate such that successive slit wedges 116 cross the optical axis 122 at the desired recording frame rate. We find it convenient to record directly in synchronism with the belt 117 by forming the belt 117 with an edge 127 of magnetic tape or the like and by continuously recording and erasing (in the manner discussed in greater detail in Fig. 5) on the tape 127, as schematically suggested at 128. In this manner, the tape 127 may always contain a plurality of frames of recorded video ready for transcription (and, if desired, for permanent filing) whenever the operator is satisfied that a satisfactory transient has been recorded.

The basic simplicity of the arrangement of Fig. 7 lends itself to incorporation in a simple attachment as may be contained within a hood or light shield 30 fitting up to or carried by the oscilloscope 115. For convenience in use, the hood may be equipped with an off-axis sight or peephole 131, and we have schematically indicated at 132 a scale which may be dimly edge-lighted for purposes of evaluating magnitudes of signals to be recorded, as will be understood.

It will be appreciated that we have described a basically simple means for recording oscilloscopic displays and having greater flexibility and convenience in use than is possible with conventional recording methods. Our arrangements lend themselves to the recording of the substantial majority of the types of displays in laboratory use. The transcribed signals may be played back immediately after the recording is made, either on the original display oscilloscope or on a separate oscilloscope, so that the original and the recreated display may be viewed simultaneously; the record may be stored indefinitely for viewing at leisure along with a verbal commentary, or it may be relayed over commercial communication links as needed. Of course, there is a basic difference between the original display and the recreated display to the extent that the bandwidth in the recreated display is but a fraction of that characterizing the original signal; but, if the rate of displaying the recreated image is above the flicker rate detectable by the eye, then no apparent difference exists from the operator's standpoint.

An important aspect of our invention is that an original trace may be developed at a high writing speed, in perhaps a few microseconds, while the slit scans the image at a greatly reduced rate; this amounts to a change of time scale, in that the signal which originally lasted for only a few microseconds is made to endure for an interval many times longer. Although not strictly necessary, it is at least desirable that the signal read into the oscilloscope be repetitive, or that it be blanked at intervals. If it is repetitive over a period approximating the read-out time, then the signal read out will be essentially the integral of the several signals which were read in. If the signal is not repetitive then the device functions properly as long as the oscilloscope is blanked (as in Fig. 2); that is, once a display has been traced, no further signal should be introduced until the read-out or scan is accomplished.

In addition to the described unusual flexibility of use, our device also lends itself to being speeded up during the recording process to catch very fast signals, and to playing back at a reduced speed. This amounts to moving the tape fast during recording, and slow during playback.

While we have described the invention in detail for the preferred forms shown, it will be understood that modifications may be made within the scope of the invention as described in the claims which follow.

We claim:

1. In combination, a cathode-ray oscilloscope, including a display face and means for projecting an electron beam of substantially uniform intensity on said face, sweep-circuit means connected to said cathode-ray oscilloscope and producing a deflection base for said beam, amplitude-modulating means for deflecting said beam generally transverse to said sweep base, an optical scanner including an optical slit-and-wedge system of which at least the slit is imaged on said face and oriented transverse to said sweep base, said scanner including means for periodically sweeping the image of said slit along the sweep base on said face, photoelectric means responsive to light from said face and passing through said slit, the wedge of said system being effectively of optical density varying along a transverse axis represented by the axis of the slit image on said oscilloscope face, and magnetic recording means responsive to the output of said photoelectric means.

2. As an article of manufacture, a cathode-ray-oscilloscope display transcriber, comprising an optical scanner including a mechanically rotatable assembly and means for continuously rotating the same, an optical slit and means for imaging said slit in a given plane in an orientation substantially transverse to the sweep base over which said scanner sweeps the image of said slit, said scanner including an optical wedge with an attenuation characteristic varying along the axis of said slit, said rotating assembly rotating once for each sweep cycle of said slit along said base, magnetic-recording tape carried by said assembly and extending circumferentially of the axis of rotation thereof, and recording means for impressing a signal on said tape and responsive to light energy passing through said slit and scanned by said scanner.

3. An article according to claim 2, and including erasing means adjacent said recording means, whereby said tape may always contain a recorded video signal representative of the most recent optical sweep of said scanner.

4. An article according to claim 3, and interconnected control means for said recording means and said erasing means, said control means including a synchronizing connection to said scanner, whereby said recording and erasing means may be disabled simultaneously and in a given phase relation with the cycle of said scanner.

5. As an article of manufacture, a cathode-ray-oscilloscope transcribing attachment, comprising an optical scanner including a slit and means for imaging said slit in a plane and for sweeping the image of said slit in said plane along a sweep base with respect to which said slit is continuously maintained substantially transversely oriented, said scanner including photoelectric means responsive to light collected by said scanner and passing through said slit, a double optical wedge between said plane and said photoelectric means, and optical means for causing said photoelectric means to respond independently to light passing through the separate halves of said optical wedge.

6. An article according to claim 5, in which said photoelectric means includes two separate photoelectric cells, and in which said last-defined optical means segregates light passing through said slit due to one wedge from light passing through the slit due to the other wedge.

7. In combination, a display oscilloscope including sweep-circuit means with control means for selectively establishing first and second reference-sweep bases on the face thereof, a scanner including an optical slit and an optical wedge and means for periodically sweeping the image of said slit along a selected one of said bases on said face and for continuously maintaining the image of said slit transversely oriented with respect to said base, means for establishing an electron beam of substantially uniform intensity in said oscilloscope, deflection means for deflecting said beam transversely to said base in response to the amplitude of an input signal, photoelectric means responsive to light passing said slit and said wedge, magnetic-tape recording means responsive to said photoelectric means, said recording means including a playback element, and control means for selectively connecting said deflection means to an input signal and to said playback means.

8. The combination according to claim 7, in which both said selective control means are interlocked, whereby upon selection of a playback display, the appropriate sweep base therefor may be automatically available.

9. In combination, an oscilloscope including a display face and means for developing a generally circular reference-sweep base thereon, a scanner rotatable on an optical axis generally aligned with the center of said base and including an optical slit, mirror means carried for rotation with said scanner and transposing the optical axis to a location radially offset from and parallel to the rotary axis, the offset corresponding substantially to the radius of said sweep base, photoelectric means responsive to light passing said slit, and an optical wedge intermediate said face and said photoelectric means and of optical density varying along the axis of the image of said slit as instantaneously projected on said face.

10. The combination of claim 9, in which said slit is on the rotary axis of said scanner and is rotated therewith.

11. The combination of claim 9, in which said wedge is a stationary element between said face and said scanner and of density varying uniformly radially with respect to said optical axis.

12. In combination, an oscilloscope including a display face and means for developing a lineal reference-sweep base thereon, scanner optics including a mirror inclined substantially 45 degrees with respect to an axis of rotation, said axis of rotation being generally transverse to a plane normal to said face and including said base, said optics further including a slit and a wedge and means for continuously orienting the image of said slit on said face substantially transverse to said sweep base, and photoelectric means responsive to light passing said slit.

13. In combination, an oscilloscope including a display face and means for developing a lineal reference-sweep base thereon, scanning optics including mirror means and means for rotating the same on an axis generally transverse to a plane normal to said face and including said base, said optics further including a slit and a wedge and means for continuously orienting the image of said slit on said face substantially transverse to said sweep base, and photoelectric means responsive to light passing said slit.

14. The combination of claim 13, in which said wedge is between said face and said scanning optics.

15. The combination of claim 13, in which said wedge is between said scanning optics and said photoelectric means.

16. The combination of claim 13, in which said wedge is a mirror of semi-reflecting character, the reflectance varying inversely as the desired attenuation along the image of said slit.

17. The combination of claim 13, in which said slit and wedge are both disposed between said scanner and said photoelectric means, and in which said slit is a mask on said wedge.

18. Oscilloscope-transcribing means, comprising an optical scanner including an optical slit-and-wedge system and means for imaging the slit of said system in a plane and for sweeping the image of said slit in said plane along a sweep base with respect to which said slit is continuously maintained substantially transversely oriented, said scanner including photoelectric means responsive to light collected by said scanner and passing through said slit, the wedge function of said system having varying light transmission along the length of said slit, an audio-frequency transducer, and magnetic-recorder means responsive concurrently to said photoelectric means and to said transducer.

19. In combination, an oscilloscope, including a display face and means for developing a lineal reference-sweep base thereon, means for producing a spot of uniform intensity on said face, and deflection means including an input-signal connection for deflecting said spot from said base in accordance with variations in input signal applied to said connection; scanning optics including a slit and means for projecting the image of said slit on said display face with an orientation generally transverse to said sweep base, said optics including wedge means having varying attenuation as a function of length along said slit, photoelectric means responsive to light passing said slit, and means for continuously moving said slit across the optical axis common to said photoelectric means and to said projection means.

20. In combination, an oscilloscope including a display face and means for developing a lineal reference-sweepbase thereon, scanning optics including an elongated endless opaque belt having formed thereon a wedge slit extending transversely of the base line of the sweep trace, said slit having convergent lateral edges, said slit having lateral edges converging over the length of said slit, projection means for imaging said slit on said display face with an orientation transverse to said sweep base, said belt being supported for continuous movement across the optical axis of said projection means, and photoelectric means responsive to light passing said slit as said slit traverses the optical axis common to said photoelectric means and to said projection means.

21. The combination of claim 20, in which said belt is formed with a plurality of like wedge slits uniformly spaced along the longitudinal axis of said belt substantially in accordance with the effective projected width of said sweep base.

22. The combination of claim 20, in which said belt includes along one edge thereof a strip of magnetic storage material.

23. As an article of manufacture, a cathode-ray-oscilloscope display transcriber, comprising an optical scanner including a mechanically rotatable assembly and means for continuously rotating the same, an optical slit and means for imaging said slit in a given plane in an orientation substantially transverse to the sweep base over which said scanner sweeps the image of said slit, said rotating assembly rotating once for each sweep cycle of said slit along said base, magnetic-recording tape carried by said assembly and extending circumferentially of the axis of rotation thereof, and recording means for impressing a signal on said tape and responsive to light energy passing through said slit and scanned by said scanner.

24. As an article of manufacture, a cathode-ray-oscilloscope display transcriber, comprising an optical scanner including an endless opaque belt having formed therein a wedge slit extending transversely of the longitudinal axis of said belt, means for continuously driving said belt, projecting means for imaging said slit in a given plane in an orientation substantially transverse to the sweep base over which said scanner sweeps the image of said slit, and magnetic-recording means driven synchronously with said belt and including photoelectric means responsive to light energy passing through said slit and scanned by said scanner.

25. The article of claim 24, in which said magnetic-recording means includes a strip of magnetic-storage material along a part of said belt.

26. In combination, a cathode-ray-oscilloscope including a display face and means for developing a reference-sweep base thereon, means for producing a spot of uniform intensity on said face, and deflection means including an input-signal connection for deflecting said spot from said base in accordance with variations in input signal applied to said connection; scanning optics including an optical slit-and-wedge system and means for imaging the slit of said system in the plane of said face and drive means for periodically sweeping the image of said slit in said plane and along said sweep base, said slit image being continuously oriented substantially transverse to said sweep base throughout the full scan period and the wedge function of said system having varying light transmission along the length of said slit, said scanner including photoelectric means responsive to light collected by said scanner and passing through said slit, recorder means connected to the output of said photoelectric means, and sweep-synchronizing-signal generator means synchronized with scanning action and also connected to said recorder means.

27. In combination, an oscilloscope including a display face and means for developing a lineal reference-sweep base thereon, means for producing a spot of uniform intensity on said face, and deflectoin means including an input-signal connection for deflecting said spot from said face in accordance with variations in input-signal applied to said connection; scanning optics including a slit of uniformly varying width as a function of length along said slit and means for projecting the image of said slit on said display face with an orientation generally transverse to said sweep base, photoelectric means responsive to lights passing said slit, and means for continuously moving said slit across the optical axis common to said photoelectric means and to said projection means.

References Cited in the file of this patent

UNITED STATES PATENTS

| | | |
|---|---|---|
| 1,648,687 | Hoxie | Nov. 8, 1927 |
| 1,715,863 | Pomeroy | June 4, 1929 |
| 1,789,521 | Feingold | Jan. 20, 1931 |
| 1,931,852 | Reichel et al. | Oct. 24, 1933 |
| 2,113,184 | Sperti | Apr. 5, 1938 |
| 2,176,847 | Cowley | Oct. 17, 1939 |
| 2,183,717 | Keall | Dec. 19, 1939 |
| 2,193,606 | Ulrey | Mar. 12, 1940 |
| 2,465,849 | Cooney | Mar. 29, 1949 |
| 2,597,001 | Jaffe | May 20, 1952 |
| 2,632,801 | Donaldson | Mar. 24, 1953 |
| 2,867,685 | Johnson | Jan. 6, 1959 |

FOREIGN PATENTS

| | | |
|---|---|---|
| 422,481 | Great Britain | Jan. 14, 1935 |